(12) United States Patent
Mailey (10) Patent No.: US 11,036,469 B2
(45) Date of Patent: *Jun. 15, 2021

(54) PARSING ELECTRONIC CONVERSATIONS FOR PRESENTATION IN AN ALTERNATIVE INTERFACE

(71) Applicant: Google LLC, Mountain View, CA (US)

(72) Inventor: Stephen Mailey, London (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,019

(22) Filed: Mar. 20, 2020

(65) Prior Publication Data

US 2020/0218503 A1 Jul. 9, 2020

Related U.S. Application Data (63) Continuation of application No. 15/805,049, filed on Nov. 6, 2017, now Pat. No. 10,599,391.

(51) Int. Cl.
| | | |
|---|---|---|
| *G06F 3/16* | (2006.01) | |
| *G06F 40/35* | (2020.01) | |
| *G06F 40/58* | (2020.01) | |
| *G06F 40/205* | (2020.01) | |
| *G06F 3/0481* | (2013.01) | |
| *G10L 15/22* | (2006.01) | |
| *H04L 12/18* | (2006.01) | |

(52) U.S. Cl.
CPC .......... *G06F 3/167* (2013.01); *G06F 3/04817* (2013.01); *G06F 40/205* (2020.01); *G06F 40/35* (2020.01); *G06F 40/58* (2020.01); *G10L 15/22* (2013.01); *G10L 2015/228* (2013.01); *H04L 12/1831* (2013.01)

(58) Field of Classification Search
CPC ......... G10L 13/02; G10L 13/03; G10L 13/08; G10L 15/22; G10L 15/228; G06F 17/30; G06F 17/279; G06F 17/289; G06F 3/04812; G06F 3/0484; G06F 3/0488; G06F 3/04817; G06F 3/167; H04L 51/10; H04L 12/1831
See application file for complete search history.

(56) References Cited

U.S. PATENT DOCUMENTS

| | | |
|---|---|---|
| 8,996,376 B2 | 3/2015 | Fleizach et al. |
| 9,190,049 B2 | 11/2015 | Kaszczuk et al. |

(Continued)

FOREIGN PATENT DOCUMENTS

| | | |
|---|---|---|
| CN | 106383648 | 2/2017 |
| CN | 108701127 | 10/2018 |

(Continued)

OTHER PUBLICATIONS

EPO, Communication pursuant to Rules 161(1) and 162 EPC dated Dec. 5, 2019 for EP application No. 18803835.0, 3 pages.

(Continued)

*Primary Examiner* — Steven P Sax
(74) *Attorney, Agent, or Firm* — IP Spring (57) ABSTRACT

Some implementations can include a computer-implemented method and/or system for parsing an electronic conversation for presentation at least partially in an alternative interface (e.g., a non-display interface) such as a voice interface or other non-display interface.

20 Claims, 5 Drawing Sheets

(56) References Cited

U.S. PATENT DOCUMENTS

| | | | |
|---|---|---|---|
| 10,116,603 | B1 | 10/2018 | Lewis et al. |
| 10,599,391 | B2* | 3/2020 | Mailey .................. G06F 40/205 |
| 2007/0162432 | A1 | 7/2007 | Armstrong et al. |
| 2013/0121481 | A1* | 5/2013 | Mikan .................... H04L 51/10 |
| | | | 379/88.14 |
| 2014/0046976 | A1 | 2/2014 | Zhang et al. |
| 2014/0089008 | A1 | 3/2014 | Carner et al. |
| 2014/0129942 | A1 | 5/2014 | Rathod |
| 2016/0195864 | A1 | 7/2016 | Kim |
| 2016/0224673 | A1 | 8/2016 | Hebert et al. |
| 2016/0269495 | A1 | 9/2016 | Deluca et al. |
| 2017/0061609 | A1 | 3/2017 | Son et al. |
| 2017/0324685 | A1* | 11/2017 | Chen ..................... H04L 51/046 |
| 2017/0353410 | A1 | 12/2017 | Gonzales |
| 2018/0083901 | A1* | 3/2018 | McGregor, Jr. ........ G06K 9/726 |
| 2018/0174587 | A1 | 6/2018 | Bermundo |
| 2018/0210874 | A1 | 7/2018 | Fuxman et al. |
| 2018/0308143 | A1 | 10/2018 | Chan et al. |
| 2018/0367484 | A1* | 12/2018 | Rodriguez ............. H04L 67/36 |
| 2019/0124021 | A1* | 4/2019 | DeMattei ............... G06F 3/0488 |

FOREIGN PATENT DOCUMENTS

| | | |
|---|---|---|
| JP | 10-254470 | 9/1998 |
| JP | 2006-318086 | 11/2006 |
| JP | 2010-072704 | 4/2010 |
| JP | 2011-248508 | 12/2011 |
| JP | 2016-014969 | 1/2016 |
| WO | 2017/146437 | 8/2017 |

OTHER PUBLICATIONS

WIPO, International Search Report for International Patent Application No. PCT/US2018/058030, dated Jan. 17, 2019, 4 pages.

WIPO, Written Opinion for International Patent Application No. PCT/US2018/058030, dated Jan. 17, 2019, 6 pages.

USPTO, First Action Interview, Pre-Interview Communication for U.S. Appl. No. 15/805,049, dated Jan. 11, 2019, 4 pages.

USPTO, First Action Interview, Office Action Summary for U.S. Appl. No. 15/805,049, dated Jun. 5, 2019, 6 pages.

USPTO, Notice of Allowance for U.S. Appl. No. 15/805,049, dated Nov. 15, 2019, 17 pages.

International Bureau of WIPO, International Preliminary Report on Patentability for International Patent Application No. PCT/US2018/058030, dated May 22, 2020, 8 pages.

JPO, Office Action for Japanese Patent Application No. 2019-559778, dated Nov. 10, 2020, 7 pages.

IPO, First Examination Report for Indian Patent Application No. 201947047037, dated Mar. 30, 2021, 6 pages.

JPO, Notice of Allowance (with English translation) for Japanese Patent Application No. 2019-559778, dated Apr. 20, 2021, 6 pages.

\* cited by examiner

PARSING ELECTRONIC CONVERSATIONS FOR PRESENTATION IN AN ALTERNATIVE INTERFACE

CROSS-REFERENCE TO RELATED APPLICATIONS

The present application is a continuation of U.S. patent application Ser. No. 15/805,049, filed Nov. 6, 2017 and titled PARSING ELECTRONIC CONVERSATIONS FOR PRESENTATION IN AN ALTERNATIVE INTERFACE, the contents of which are incorporated herein by reference in their entirety.

BACKGROUND

Users of mobile devices may participate in electronic conversations. The electronic conversation may include mixed media (e.g., a combination of one or more of text messages, symbols such as emoji, abbreviated text shorthand, images, videos, multimedia objects, links to other resources such as uniform resource locators, etc.). Users may sometimes be in a setting where viewing of an electronic conversation on a display is not appropriate (e.g., when a user is operating a vehicle). Accordingly, presentation of an electronic conversation via an alternative interface such as voice may be useful to some mobile device users.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to electronic messaging, and in particular to methods and systems for parsing an electronic conversation for presentation at least partially in an alternative interface (e.g., a non-display interface) such as a voice interface or other non-display interface.

Some implementations can include a computer-implemented method. The method can include identifying one or more objects in an electronic conversation comprising a plurality of objects, wherein the plurality of objects are of different media types, and grouping the one or more objects into one or more object groups, wherein each object group contains at least one object. The method can also include programmatically analyzing the electronic conversation based on the one or more object groups to determine a conversational structure of the electronic conversation, and applying conversational framing to the one or more object groups based on the conversational structure of the electronic conversation to generate a voice interface conversational presentation. The method can further include providing the voice interface conversational presentation configured for output by an audio output device.

In some implementations, identifying the one or more objects can include identifying one or more verbal objects and one or more non-verbal objects. Grouping the one or more objects can include grouping sequential verbal objects, grouping sequential non-verbal objects, and retaining sequence information of the electronic conversation. In some implementations, applying conversational framing can include automatically identifying content of a non-verbal object and including a textual description of the non-verbal object.

Applying conversational framing can include inserting an introductory conversational framing portion at a beginning of the voice interface conversational presentation. In some implementations, the introductory conversational framing portion can include identification of one or more participants in the electronic conversation.

Applying conversational framing can include inserting one or more interstitial conversational framing portions between a pair of object groups. The one or more object groups can include at least two object groups, and the one or more interstitial conversational framing portions can be inserted between one or more respective pairs of the at least two object groups.

Applying conversational framing can include inserting a conclusory conversational framing portion between a last object group and a preceding object group, where the preceding object group immediately precedes the last object group. Identifying the one or more objects within the electronic conversation can include programmatically analyzing an encoding of objects in the electronic conversation.

Applying conversational framing can include one or more of expanding shorthand text, leaving shorthand text in place, and replacing text with text of another language. Applying conversational framing can include converting a graphical symbol to a textual description of the graphical symbol.

The method can also include presenting an audio query to a user when a determination is made that an operational context indicates that voice interface presentation is a suitable form of presentation, and receiving an audio response to the audio query. The method can further include causing the voice interface conversational presentation to be output from the audio output device based on the audio response. The electronic conversation can include a text portion and at least one of an image, a graphical symbol and a uniform resource locator.

The method can also include determining a context of a device. The method can further include causing the voice interface conversational presentation to be output via the audio output device when the context of the device is one for which voice output is suitable, and causing the electronic conversation to be displayed on a display device when the context of the device is one for which visual display is suitable.

Some implementations can include a system comprising one or more processors coupled to a non-transitory computer readable medium having stored thereon software instructions that, when executed by the one or more processors, cause the one or more processors to perform operations. The operations can include identifying one or more objects in an electronic conversation comprising a plurality of objects, wherein the plurality of objects are of different media types, and programmatically analyzing the electronic conversation to determine a conversational structure of the electronic conversation. The operations can also include applying conversational framing to the one or more objects based on the conversational structure of the electronic conversation to generate an alternative interface conversational presentation. The operations can further include providing the alternative interface conversational presentation having at least a portion configured for output by a non-display output device.

Identifying the one or more objects can include identifying one or more verbal objects and one or more non-verbal objects. Identifying the one or more objects can include programmatically analyzing an encoding of the one or more objects.

Some implementations can include a non-transitory computer readable medium having stored thereon software instructions that, when executed by one or more processors, cause the one or more processors to perform operations. The operations can include identifying one or more objects in an electronic conversation comprising a plurality of objects, wherein the plurality of objects are of different media types, and programmatically analyzing the electronic conversation to determine a conversational structure of the electronic conversation. The operations can also include applying conversational framing to the one or more objects based on the conversational structure of the electronic conversation to generate an alternative interface conversational presentation. The operations can further include providing the alternative interface conversational presentation having at least a portion configured for output by a non-display output device. Identifying the one or more objects can include identifying one or more verbal objects and one or more non-verbal objects.

DETAILED DESCRIPTION

The systems and methods provided herein may overcome one or more deficiencies of some conventional messaging systems and methods. For example, electronic messaging systems permit users to engage in electronic conversations (e.g., conversations conducted using electronic devices such as phones, tablets, wearable devices, computers, etc. and mediated by electronic platforms such as chat or messaging platforms, social networks, etc.) with other users. The electronic conversations may be conducted via a chat or messaging application that provides a user interface for users to view received messages, send messages, add or remove participants to the electronic conversation, save conversations, etc. Messages may include verbal messages, e.g., text, and non-verbal messages, e.g., images, videos, URLs, interactive objects (e.g., invitations, notifications of receiving a payment), computer files, etc.

With the easy availability of mobile devices, such as phones, wearable devices, head-mounted devices, tablets, personal computers, etc., users may be able to participate in electronic conversation with each other in a variety of settings and contexts. Some of the settings and contexts in which a user may be participating in an electronic conversation may not be suitable for a visual display of the conversation. Some conventional messaging systems may not provide an alternative interface other than a visual display user interface for the conversation or may provide an alternative interface that is not efficient, where efficiently presenting an electronic conversation may be useful to a user.

For example, some conventional messaging systems may provide an alternative interface for presenting conversation, e.g., a voice interface presentation of the conversation, etc. However, such presentation may not be useful due to one or more limitations. For example, some conventional voice presentations of conversation may include a literal voice output of conversation elements that are non-verbal (e.g., links to other resources, images, videos, emojis, shorthand text, etc.). Such literal voice output of non-verbal items may be an inefficient use of the user's time and may also be inefficient with respect to processor utilization, battery or power use, memory utilization, etc. For example, greater battery power and processor utilization may be needed for voice presentation (e.g., using a speaker device) of an entire URL (e.g., http://www.technologynews.com/consumer/smartphone/2017/oct/google-pixel-released-to-great-reviews/) rather than a title of the corresponding web page (e.g., "Google Pixel released to great reviews"), where the latter presentation is also more effective for the user.

Conventional messaging systems may not recognize non-verbal conversational elements when providing alternative interface presentations, or may not efficiently interpret or format the non-verbal elements for alternative interface presentation. Moreover, conventional messaging systems may not provide conversational framing for presentation in alternative interface such that a user can glean the context and follow the flow of the conversation within the alternative interface presentation.

The example systems and methods described herein may overcome one or more of the deficiencies of conventional messaging systems to provide users with alternative interface presentation of electronic conversations that handle non-verbal conversation elements and also provide conversational framing. A technical problem of some conventional messaging systems may be that such systems do not interpret non-verbal conversation elements and do not provide conversational framing for alternative interface presentation of the conversation. Further, conventional systems that provide alternative interfaces may generate alternative interface presentation that present non-verbal items in a literal manner that may be inefficient with respect to computation cycles, memory usage and/or power usage of a device.

The disclosed subject matter relates to particular techniques to generate an alternative interface presentation of an electronic conversation (e.g., a voice presentation of a multimedia chat conversation). The alternative interface presentation is based on parsing the conversation by instantiating a process on a computer to parse the conversation to determine objects within the conversation and the type of those objects (e.g., verbal or non-verbal). The process on the computer can determine one or more groups of conversation objects and provide conversational framing for the one or more groups.

Particular implementations may realize one or more of the following advantages. An advantage of generating alternative interface presentations of a conversation based on methods and system described herein is that the alternative interface presentation may be more efficient for the user (e.g., by permitting the user to receive messages when a display interface is not suitable) and for the device providing the presentation (e.g., saving computational resources, battery or power resources, and/or memory resources). Another advantage is that, the device may be able to present the conversation with a shorter duration of presentation based on interpreting non-verbal conversation elements and presenting those elements more efficiently (e.g., by presenting textual verbal summaries of non-verbal objects), which can result in fewer processing operations and thus reduced latency in the overall system. Another advantage of presenting in conventions of conversational language includes eliminating a need to learn a new format for interface presentation (e.g., by having familiarity of conversational language, users may not need to be trained to understand the conversational voice interface). In addition to eliminating a training period for usage of the device, presenting in a conversational voice interface can help reduce cognitive load of users and potentially improve device usage efficiency.

A further advantage of some implementations is that the decision to present a conversation in an alternative interface can be based on a user's context (e.g. as indicated by one or more of device location, device movement, scheduled activities on a calendar, etc.) obtained with permission of the user, which can permit the conversation to be presented automatically using the interface that is appropriate or suitable for the context of use, which can result in advantages such as safer usage of devices (e.g., when the user is operating a vehicle), usage of devices in contexts where a conventional user interface is unsuitable (e.g., when the user is engaged in an activity, e.g., cooking, workout, cleaning, etc.), more timely usage of devices (e.g., a user may be able to participate in a conversation in a more timely manner), and improved interaction (e.g., users able to participate in conversations as users changes usage context or setting).

Figure 1:
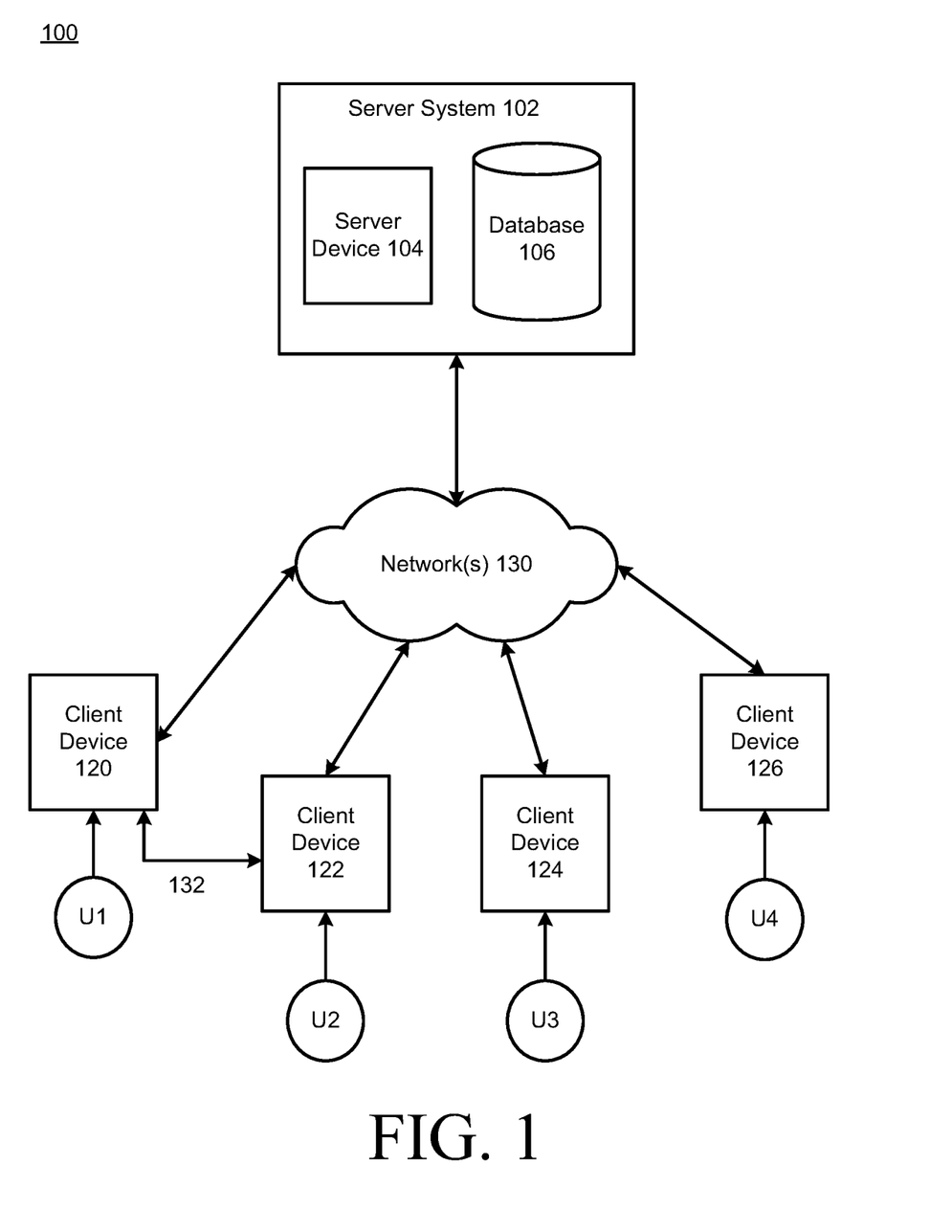
FIG. 1 is a block diagram of example systems and a network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Blocks representing server system 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices.

Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may comprise one or more participants in a conversation and may communicate with server system 102 and/or each other using respective client devices 120, 122, 124, and 126. In some examples, users U1, U2, U3, and U4 may interact with each other via applications running on respective client devices and/or server system 102, and/or via a network service, e.g., an image sharing service, a messaging service, a social network service or other type of network service, implemented on server system 102. For example, respective client devices 120, 122, 124, and 126 may communicate data to and from one or more server systems (e.g., server system 102).

In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

Various implementations of features described herein can use any type of system and/or service. For example, social networking services, image collection and sharing services, assisted messaging services or other networked services (e.g., connected to the Internet) can include one or more described features accessed by client and server devices. Any type of electronic device can make use of features described herein. Some implementations can provide one or more features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
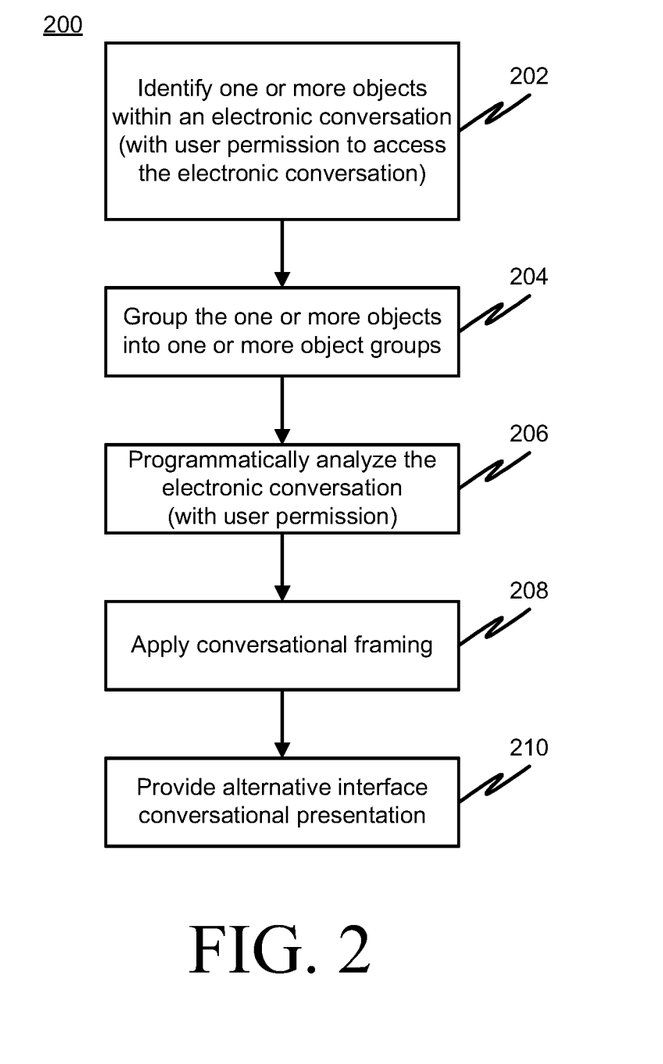
FIG. 2 is a flow diagram illustrating an example method of parsing an electronic conversation for presentation in a voice interface, according to some implementations.

FIG. 2 is a flow diagram illustrating an example method 200 (e.g., a computer-implemented method) to parse and conversationally frame an electronic conversation for presentation in an alternative interface, such as a voice interface, according to some implementations.

In some implementations, method 200 can be implemented, for example, on a server system 102 as shown in FIG. 1. In other implementations, some or all of the method 200 can be implemented on one or more client devices 120, 122, 124, or 126 as shown in FIG. 1, one or more server devices, and/or on both server device(s) and client device(s). In described examples, the implementing system includes one or more digital hardware processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input and/or device context (obtained with permission of the user). A user may, for example, have selected the initiation of the method 200 from a displayed user interface. In some implementations, method 200 or portions thereof can be performed with guidance by the user via user input. For example, some implementations can include presenting an audio query to a user when a determination is made that an operational context indicates that voice interface presentation is a suitable form of presentation, and receiving an audio response to the audio query. The implementations can include causing the voice interface conversational presentation to be output from the audio output device based on the audio response. The system will not use, process or store user information such as device context, location, etc. without explicit permission from the user.

In some implementations, method 200 may be automatically invoked (or automatically invoked with user permission) when the context of the device is determined to be one in which presentation of electronic conversations by voice (or other non-display) interface would be a suitable form of presentation (e.g., when the device detects that the context is that a user is driving a car, or that the context is that a user has requested a non-visual interface due to physical limitations or other limitations such as surroundings not suitable for viewing a display). Another context is when the user's device is low on battery or when the user is away from a power source, where switching off the display screen and presenting a voice user interface may be advantageous to conserve battery capacity. Context can be determined when explicit permission is given by a user for the application or system to obtain context information.

In some implementations, the method 200, or portions of the method, can be initiated automatically by a device. For example, the method (or portions thereof) can be periodically performed, or performed based on the occurrence of one or more particular events or conditions. For example, such events or conditions can include a message that has been received by, uploaded to, or otherwise accessible by a device (e.g. a user device), a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In some examples, a device (server or client) can perform the method 200 with access to one or more applications that receive electronic conversation messages (if user consent is received). In another example, a camera, cell phone, tablet computer, wearable device, or other client device can receive electronic conversation messages and can perform the method 200. In addition, or alternatively, a client device can send one or more electronic conversation messages to a server over a network, and the server can process the messages using method 200.

In block 202, one or more objects within an electronic conversation are identified. User permission is obtained prior to the system accessing the user's electronic conversation. The electronic conversation can include a mixed media electronic conversation such as a conversation having a variety of different types of messages. Message type can include text messages, audio messages, images, videos, symbols (e.g., emoji), shorthand text, text in other languages, interactive objects, multimedia objects, currency, virtual gifts, interactive virtual objects, game objects, etc. The objects in a conversation can be determined based on information within each message or portion of the conversation. For example, in a multimedia messaging conversation, there may be an encoding of objects in the conversation including header information that indicates a type of content of each message or portion of the conversation. For example, text portions may have a first type indicated in a header or other portion of the message, images may have a second type indicated in the header or other portion, etc. Processing continues to 204.

At 204, the objects identified in 202 can optionally be grouped into one or more object groups, where each group includes one or more objects of the same object type (e.g., verbal objects grouped together, non-verbal objects grouped together by type such as image, URL, etc.). For example, if a conversation includes two text messages followed by three images and then a text message and an emoji, the grouping could include a first group comprising the two text messages, a second group of the three images, a third group of the text message and a fourth group having the emoji. Another example could include text followed by a video and a URL, followed by more text, followed by a tic-tac-toe board game object. Grouping objects can be based on verbal and non-verbal objects, or based on independent groups, e.g., verbal, video, image, interactive object, etc. and suitable conversation framing will be used. The groups can be formed and organized so as to preserve and capture information corresponding to the sequence of messages in the conversation. The sequence information may be used in providing conversational framing and in presenting the conversation.

Figure 3A:
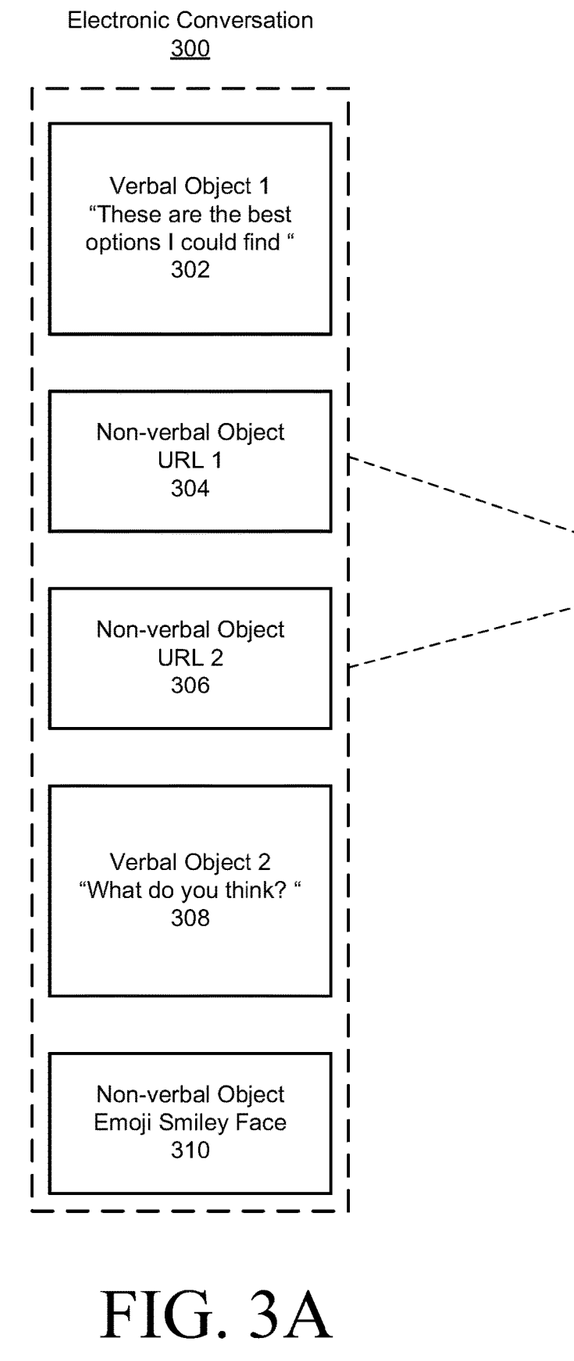
FIGS. 3A and 3B are diagrams of an electronic conversation before and after parsing, according to some implementations.

In another example, the electronic conversation 300 of FIG. 3A could be parsed (e.g., at 202) and determined to contain a verbal object (302), two non-verbal objects (304, 306), a verbal object 2 (308) and a non-verbal object (310). The electronic conversation 300 can be grouped according to block 204 to yield grouped conversation 301 of FIG. 3B, which includes a first verbal object group 312, a first non-verbal group 314, a second verbal group 316, and a second non-verbal group 318. Processing continues to 206.

At 206, the conversation is programmatically analyzed to determine a conversational structure of the conversation. User permission is obtained prior to programmatically analyzing the electronic conversation (e.g., permission to programmatically analyze can be provided in conjunction with permission to access the electronic conversation, or may be provided separately). Programmatically analyzing the conversation can include analyzing the one or more groups from 204 (if grouping was used) and/or analyzing the objects identified in 202. The programmatic analysis determines the structure of the conversation and identifies conversational reference points that can be used to provide conversational framing. Conversational reference points can include points in the conversation between pairs of object groups.

Programmatic analysis of the conversation can also optionally include analysis of the non-verbal objects or groups of objects. The programmatic analysis can include identifying non-verbal objects and providing a verbal representation of those objects that may be suitable for presentation in an alternative interface such as voice. For example, a group of three image objects may be programmatically analyzed, determined to be three objects of image type (e.g., via analysis of the header information) and represented as a verbal conversational element of "three pictures" or the like. In another example, the system could present an invitation in a voice interface, e.g., "sender A invited you to a party at 10 pm tomorrow at his house." In another example, the system can present receipt of a payment or gift in a voice interface, e.g., "sender A sent you $10 and said 'this is for yesterday's movie ticket.'" Such programmatic analysis can also be applied to animated images and videos Programmatic analysis can also include using a system or service to identify content of the image, animated image, or video and provide an indication of content of the non-verbal object(s). Access to content of non-verbal objects such as images, videos, etc., and processing to perform image content analysis, etc., can be performed upon receiving explicit permission of the user. The content indication can then be included in the verbal representation of the non-verbal object. For example, if a message contains a text object ("Check these places out"), three image objects (e.g., three pictures of beach resorts), and a final text object (e.g., "Let me know which one you like"), the programmatic analysis of the three image objects could include sending the images to a system for image content analysis and utilizing a result of the content analysis in the verbal representation. For example, if the image content analysis returns that the three images are each of a beach resort, the programmatic analysis could generate a verbal representation such as "three pictures of beach resorts" as the verbal representation of the non-verbal image objects." In addition to, or as an alternative to, sending non-verbal objects to an external system for analysis, non-verbal object metadata could be used to determine content or features of the non-verbal objects and local analysis of content can be performed.

Programmatic analysis can include providing a representation of a graphical symbol as a verbal element (e.g., as a textual description). For example, a smiling face emoji could be programmatically analyzed and represented as the text "Smiley face" or the like. The programmatic analysis of representing symbolic elements as verbal elements can include using a lookup table to look up a numerical code corresponding to the symbol (e.g., emoji), retrieving a verbal description or text for that symbol from the table and providing that verbal description as an element for the alternative interface presentation of the conversation.

Programmatic analysis can also include expanding shorthand text (e.g., CUL8tr could be expanded as "see you later"). The shorthand text expansion could be accomplished via table lookup or other suitable method. Programmatic analysis could also include translating shorthand text (or other verbal or non-verbal objects) into another language. For example, if a shorthand code from the English language is used, but the user is a Spanish speaker, the system could expand the English shorthand code into Spanish words for verbal presentation.

Figure 3B:
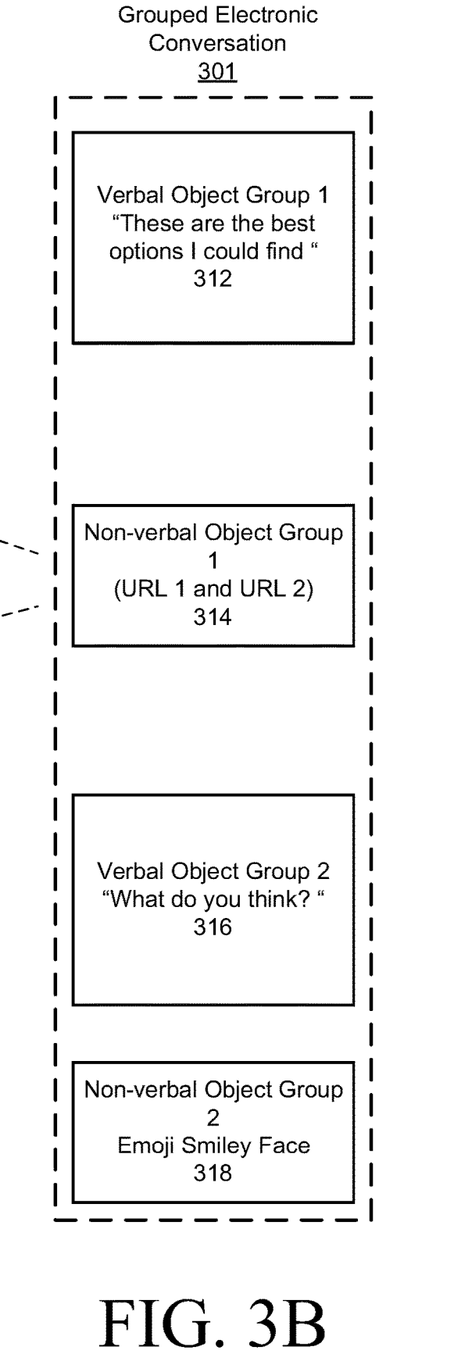
Figure 4:
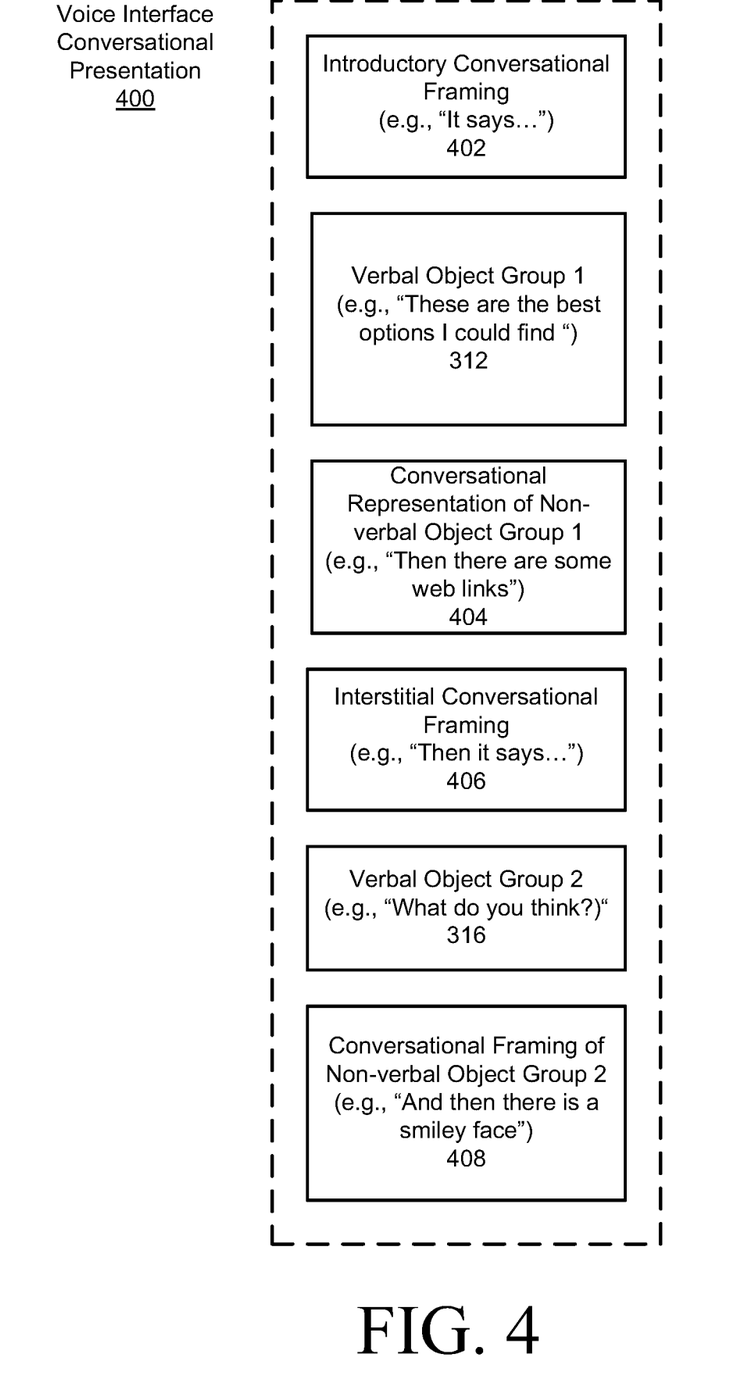
FIG. 4 is a diagram of an example electronic conversation that has been parsed and augmented with conversational framing in accordance with some implementations.

In another example, the non-verbal group 314 of FIG. 3B can be programmatically analyzed to generate the verbal representation 404 of FIG. 4. Also, the second non-verbal group 318 of FIG. 3B can be programmatically analyzed to generate the verbal representation 408 of FIG. 4. Processing continues to 208.

At 208, conversational framing is applied to the analyzed conversation. For example, conversational framing can be applied to one or more of the objects of 202, the groups of objects of 204, and/or verbal representations generated at 206. Conversational framing can include an introductory conversational framing portion that can optionally include information about a sender of the message. For example, the introductory conversational framing could include "It says" or the introductory conversational framing could reference the sender and include "Mary says", etc. The introductory conversational framing portion can be inserted at the beginning of a voice interface conversational presentation (or other alternative interface conversational presentation such as Braille, or a combination of voice and limited display, etc.).

The conversation framing can optionally include one or more interstitial framing portions such as "Then it says", etc. The presence and number of interstitial framing portions may depend on the number of objects or groups of objects in the conversation or portion of the conversation being parsed and framed for presentation in an alternative interface. Interstitial conversation framing portions can be inserted between one or more respective pairs of object groups.

The conversational framing can include an optional conclusory conversational framing portion such as "And then it says" or "And finally it says", etc. that is inserted prior to a last object group (or between the last object group and a preceding object group that is next to the last object group). The introductory, interstitial and/or conclusory conversation framing portions can be combined with a verbal object or verbal representation of a non-verbal object. For example, the second non-verbal group 318 (the emoji) could be combined with a conclusory conversation framing element to yield a conversation element that includes the verbal representation of the emoji and the conclusory conversational framing portion (e.g., verbal representation 408). Some implementations can provide a longer summary (e.g., multiple message summary, message count summary, summary of multiple conversations, etc.), such as "there are 50 unread messages; Jessica and Sean have been talking about a vacation in Thailand and have exchanged some photos, and found tickets for first week of December."

For example, the grouped conversation 301 of FIG. 3B can have conversational framing applied to generate voice interface conversation presentation 400 as shown in FIG. 4. The conversational framing can include an introductory conversational framing portion 402, interstitial conversational framing portion 406, and verbal representation 408 (including conclusory conversational framing portion). Processing continues to 210.

At 210, the alternative interface conversation presentation is provided as output. For example, the voice interface conversation presentation 400 can be provided as output for playing through an audio output device such as a speaker, headphones, etc.

In FIG. 2, various blocks (e.g., blocks 202-210) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks. The table can then be used to determine thresholds based on values in the table.

FIGS. 3A and 3B show diagrams of an example electronic conversation 300 and an example grouped electronic conversation 301. The electronic conversation 300 includes a first verbal object 302 (e.g., "These are the best options I can find" or, in another example could include "User A says these are the best options I can find"). The electronic conversation 300 includes two non-verbal objects 304 and 306 (e.g., URLs). The electronic conversation 300 continues with a second verbal object 308 (e.g., "What do you think?"), followed by a non-verbal object 310 (e.g., a smiling emoji).

The grouped electronic conversation 301 includes a first verbal object group 312, a first non-verbal object group 314, a second verbal object group 316, and a second non-verbal object group 318.

FIG. 4 shows a diagram of a voice interface conversation presentation 400, which includes introductory conversational framing 402, the first verbal object group 312, a conversational representation of the first non-verbal object group 404, interstitial conversation framing 406, the second verbal object group 316, and conversational framing of the second non-verbal object group 408 (including conclusory conversational framing).

Figure 5:
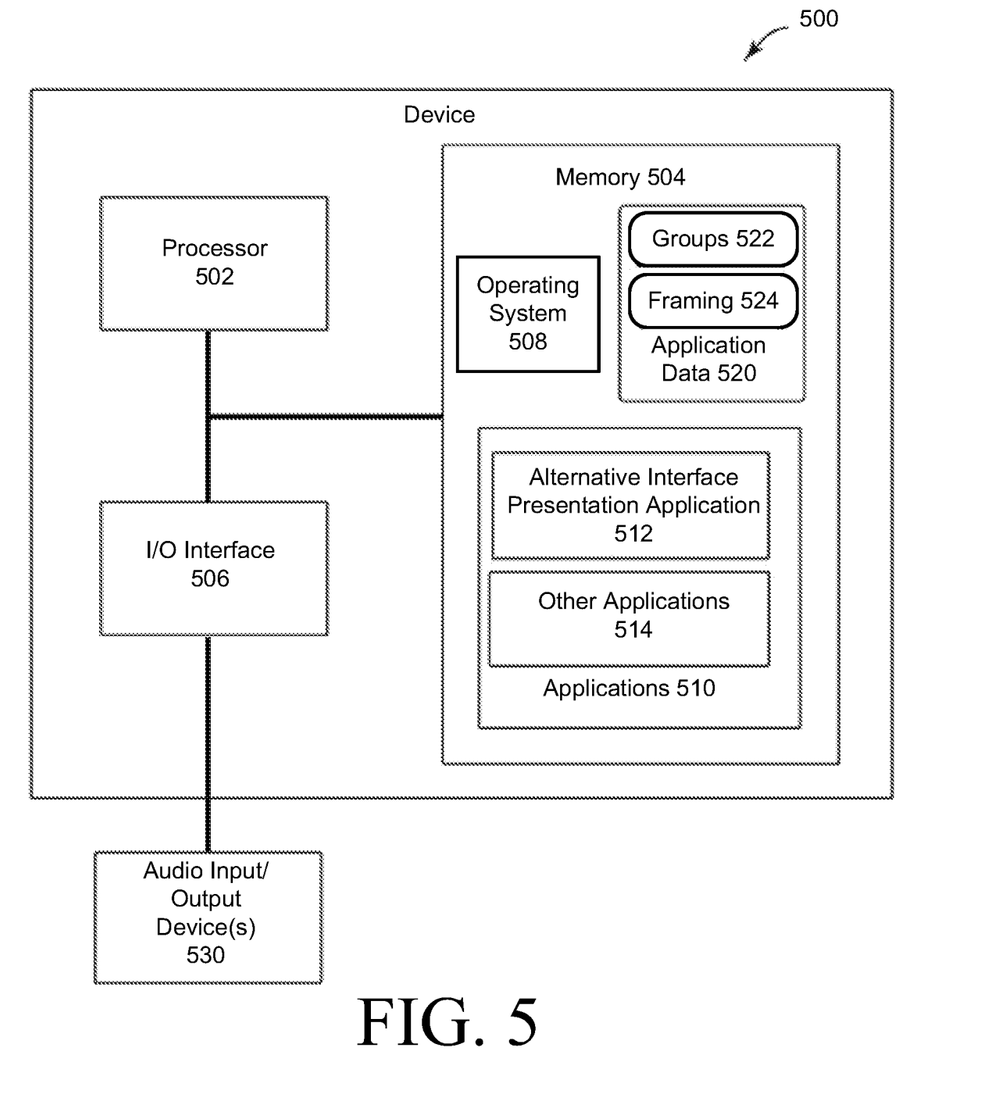
FIG. 5 is a block diagram of an example device which may be used for one or more implementations described herein.

FIG. 5 is a block diagram of an example device 500 which may be used to implement one or more features described herein. In one example, device 500 may be used to implement a computer device, e.g., a server device (e.g., server device 104 of FIG. 1), and perform appropriate method implementations described herein. Device 500 can be any suitable computer system, server, or other electronic or hardware device. For example, the device 500 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 500 includes a processor 502, a memory 504, and I/O interface 506.

Processor 502 can be one or more processors and/or processing circuits to execute program code and control basic operations of the device 500. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, one or more applications 510, e.g., an alternative interface presentation application 512, other applications 514 and application data 520. In some implementations, applications 510 can include instructions that enable processor 502 to perform the functions described herein, e.g., some or all of the method of FIG. 2.

For example, applications 510 can include a voice interface presentation application 412, which as described herein can provide electronic conversation parsing and conversational framing, and other functions, e.g., providing a conversation configured for output by a voice interface or other non-display interface or non-display output device. In some implementations, the voice interface presentation application can include receiving one or more electronic conversation messages, parsing the messages and adding conversation framing to the parsed messages in order to provide a voice interface presentation for output on an audio device of the device 500. Other applications 514 (or engines) can also or alternatively be included in applications 510, e.g., email applications, SMS and other phone communication applications, web browser applications, media display applications, communication applications, web hosting engine or application, social networking engine or application, etc. Any of software in memory 504 can alternatively be stored on any other suitable storage location or computer-readable medium. In addition, memory 504 (and/or other connected storage device(s)) can store application data such as electronic conversation messages, groups of electronic conversation messages, conversational framing elements, user data and preferences, and other instructions and data used in the features described herein. Memory 504 and any other type of storage (magnetic disk, optical disk, magnetic tape, or other tangible media) can be considered "storage" or "storage devices."

For example, application data 520 can include groups 522 and framing 524. For example, groups 522 may include grouped electronic conversational messages or portions (e.g., text groups, image groups, URL groups, etc.). Conversational framing 524 can include a plurality of conversational framing elements that can be used to frame the electronic conversation groups for presentation by voice or other interface. For example, the conversational framing elements could be stored in lists or tables of the framing portions. For example, singular conversational framing elements can include "a picture", "a picture of <X>", "a video", "a video of <X>", "a weblink", "a link to <X>", etc. Conversational framing portions for plural grouping of similar type can include "some pictures", "some pictures of <X>", etc. In some implementations, machine-learning can be used to determine image description such as those denoted by X above (e.g., user(s) describe image as X, automated assistant then describes similar image as X).

I/O interface 506 can provide functions to enable interfacing the device 500 with other systems and devices. For example, network communication devices, storage devices (e.g., memory and/or database 106), and input/output devices can communicate via I/O interface 506. In some implementations, the I/O interface can connect to interface devices including input devices (keyboard, pointing device, touchscreen, microphone, camera, scanner, etc.) and/or output devices (display device, speaker devices, printer, motor, haptic output device, etc.). Audio input/output devices 530 are an example of input and output devices that can be used to receive audio input and provide audio output (e.g., voice interface output) as described herein. Audio input/output devices 530 can be connected to device 500 via local connections (e.g., wired bus, wireless interface) and/or via networked connections and can be any suitable devices, some examples of which are described below.

For ease of illustration, FIG. 5 shows one block for each of processor 502, memory 504, I/O interface 506, and software blocks 508 and 510. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While server system 102 is described as performing operations as described in some implementations herein, any suitable component or combination of components of server system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 500, e.g., processor(s) 502, memory 504, and I/O interface 506. An operating system, software and applications suitable for the client device can be provided in memory and used by the processor, e.g., image management software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. Audio input/output devices 530, for example, can be connected to (or included in) the device 500 to receive audio input (e.g., voice commands) and provide audio output (e.g., voice interface) and can include any suitable devices such as microphones, speakers, headphones, etc. Some implementations can provide an audio output device, e.g., voice output or synthesis that speaks text.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, an alternative interface can include other non-visual aspects beyond audio, e.g. Braille for visually impaired users, and haptic (e.g., a "love" sticker could correspond to a particular beat or pattern from a haptic output device). In some implementations, the conversation may be output using a combination of output devices such as audio and a visual display. For example, some devices (e.g., watches, other wearables) may be suitable to display certain media (e.g., text, photos) but may be unsuitable for other media (e.g., video, panoramic photos, 3D media etc.). Some device may be incapable of playing certain media (e.g., devices with no audio output capability, devices with 2D display outputting 3D content, a black and white screen displaying color, etc.). In the above contexts, a presentation of the electronic conversation may include verbal and non-verbal objects (e.g., text and images) along with conversational framing (e.g., description of video, 3D content, etc.) in text or audio format. For example, an assistant product for home or other settings may have only audio output, or may have audio and limited display. In such examples, an implementation could tailor the presentation of the electronic conversation to include outputting conversational objects in the formats suitable for available output devices and providing conversational framing for objects that do not have a suitable output device available.

A non-verbal object can include a static image (e.g., a single frame with no motion), an animated image, a video (e.g., with a plurality of frames), etc. For example, a static image may depict one or more faces with a fixed expression, while an animated image may depict one or more faces with expressions that change within the image (e.g., a live photo that captures a face with eyes transitioning between closed and open, face with the mouth moving from a non-smiling to a smiling position, etc.) A video may include a plurality of frames that depict one or more persons.

Programmatically analyzing non-verbal objects can include detecting action and performing face recognition on a video (e.g., an entire video, or a portion of the video frames can be used to analyze the video) to produce a verbal description (e.g., "Allen riding a horse."), detecting action without face recognition (e.g., "Two people walking"), detecting celebrities and/or movie clips (e.g., "excerpt from Mission Impossible"), and detecting objects and motion in other types of videos or animations (e.g., "animation showing a cat and a mouse").

Examples of other non-verbal objects and associated textual representations include 360 degree views (e.g., Immersive view of Taj Mahal"), cinemagraph/animated GIF ("Your friend Bob is making a rolling eyes gesture"), audio (e.g., summary of audio transcript, recognition of audio such as music or song, etc.), games and interactive multimedia objects (e.g., a football you can throw with a gesture", etc.), and memes (e.g., "Batman character Joker laughing").

Non-verbal objects can include metadata that can be programmatically analyzed to generate a verbal representation or summary of the non-verbal objects. The verbal description of non-verbal objects can be generated by a server device (e.g., 104) that is mediating the electronic conversation. In some implementations, the client device used for the electronic conversation may generate the verbal or textual description of non-verbal objects. The techniques described herein can be used with non-encrypted conversations and with encrypted conversations. In end to end encrypted conversations, method 200 can be performed on a client device only. In some implementations, the non-verbal objects may be processed (e.g., compressed, converted to low resolution, etc.) before being programmatically analyzed. No information about a conversation is provided to a server without user consent.

In some implementations, the parsing, conversational framing and presentation in an alternative interface can be performed in whole or in part by an assistive software application or bot. A bot can include an automated service, implemented on one or more computers, that users interact with typically through text or voice, e.g., via a messaging application operating on a client device such as client device 120 and/or on a server device such as server device 104. A bot may be implemented by a bot provider such that the bot can interact with users of various messaging applications or other applications. In some implementations, a provider of a messaging application may also provide one or more bots. In some implementations, bots provided by the provider of the messaging application may be configured such that the bots can be included in other messaging applications, e.g., provided by other providers. A bot may provide several advantages over other modes. A user may interact with a bot via text and/or voice, which may require minimal or no learning, compared with that possibly required to use a website, software application, a telephone call, e.g., to an interactive voice response (IVR) service, or other manners of interacting with a service. Incorporating a bot within a messaging service or application may also permit users to collaborate with other users to accomplish various tasks such as travel planning, shopping, scheduling events, obtaining information, etc. within the messaging service, and eliminate cumbersome operations such as switching between various applications (e.g., a taxi booking application, a restaurant reservation application, a calendar application, etc.) or websites to accomplish the tasks.

A bot for parsing electronic conversation for presentation in an alternative interface as described herein may be implemented as a computer program or application (e.g., a software application) that is configured to interact with one or more users (e.g., any of the users U1-U4) in connection with one or more messaging applications.

Implementing bots that can communicate with users of messaging applications may provide many advantages. As discussed above, the bot could parse electronic conversations and present those conversations in an alternative interface that is suitable for a context in which a client device is being used (e.g., presenting conversations in a voice interface when a user is operating a vehicle).

In certain embodiments, a bot may use a conversational interface to use natural language (e.g., conversational framing) to interact conversationally with a user. In certain embodiments, a bot may use a template-based format to create sentences with which to interact with a user, e.g., in response to a request for a restaurant address, using a template such as "the location of restaurant R is L." In certain cases, a user may be enabled to select a bot interaction format, e.g., whether the bot is to use natural language to interact with the user, whether the bot is to use template-based interactions, etc.

In cases in which a bot interacts conversationally using natural language, the content and/or style of the bot's interactions may dynamically vary based on one or more of: the content of the conversation determined using natural language processing, the identities of the users in the conversations, and one or more conversational contexts (e.g., historical information on the user's interactions, connections between the users in the conversation based on a social graph), external conditions (e.g., weather, traffic), the user's schedules, related context associated with the users, and the like. In these cases, the content and style of the bot's interactions is varied based on only such factors for which users participating in the conversation have provided consent.

As one example, if the users of a conversation are determined to be using formal language (e.g., no or minimal slang terms or emojis), then a bot may also interact within that conversation using formal language, and vice versa.

In certain embodiments, a user participating in a conversation may be enabled to invoke a specific bot or a bot performing a specific task, e.g., by typing a bot name or bot handle (e.g., taxi, @taxibot, @movies, etc.), by using a voice command (e.g., "invoke bankbot", etc.), by activation of a user interface element (e.g., a button or other element labeled with the bot name or handle), etc. Once a bot is invoked, a user may request that the bot parse and read received messages to the user in a voice interface.

In certain embodiments, a bot may automatically suggest information or actions within a messaging conversation without being specifically invoked. That is, the users may not need to specifically invoke the bot. In these embodiments, the bot may depend on analysis and understanding of the context of a user (obtained with user permission) on a continual basis or at discrete points of time. The analysis of the context may be used to understand specific user needs and to identify when assistance should be suggested by a bot. As one example, a bot may determine that the user device is moving in a manner that suggests the user is in a vehicle and the bot may suggest that incoming messages be parsed and presented in a voice interface or other alternative interface.

In the embodiments in which a bot may automatically suggest information or actions within a messaging conversation without being specifically invoked, such functionality is disabled, e.g., if one or more users participating in the messaging conversation do not provide consent to a bot performing analysis of the users' conversation. Further, such functionality may also be disabled temporarily based on user input. For example, when the users indicate that a conversation is private or sensitive, analysis of conversational context is suspended until users provide input for the bot to be activated. Further, indications that analysis functionality is disabled may be provided to participants in the conversation, e.g., with a user interface element.

In various implementations, a bot may be implemented in a variety of configurations. For example, a bot can be implemented on a client device (e.g., 120-126). In this example, the bot may be a module in a software application that is local to client device. The bot may be implemented locally on a client device such that the user can engage in conversation with the bot in connection with a messaging application on the client device.

In another example, a bot can be implemented on both a client device and a server device. In this example, the bot may be implemented, e.g., as a client-server computer program, with portions of the bot functionality provided by each of the client bot and the server bot. In some implementations, a bot may be implemented as a distributed application, e.g., with modules distributed across multiple client devices and servers (e.g., client devices, server devices, etc.). In some implementations, a bot may be implemented as a server application that is implemented on a server device.

Different implementations such as client-only, server-only, client-server, distributed, etc. may provide different advantages. For example, client-only implementations permit bot functionality to be provided locally, e.g., without network access, which may be advantageous in certain contexts, e.g., when a user is outside of network coverage area or in any area with low or limited network bandwidth. Implementations that include one or more servers, such as server-only, client-server, or distributed configurations may permit certain functionality, e.g., ticket reservations, etc. that may not be possible to provide locally on a client device.

A bot may be distinct from a messaging application and, in some implementations, one or more bots may be implemented as part of a messaging application. In the implementations in which bots are implemented as part of a messaging application, user permission can be obtained before implementing bots. In some implementations, third parties distinct from a provider of messaging application and users, may provide bots that can communicate with users.

Object recognition and parsing for non-verbal objects as well as identifying and rendering conversational framing can be performed using machine-learning techniques. For example, verbal objects may be parsed and summarized using LSTM models, image/video content could be parsed using machine-learning models trained for object recognition; interactive objects could be recognized using models specially trained for those types of objects, etc. For example, electronic communication parsing applications may implement machine learning, e.g., a deep learning model, that can enhance user interaction with messaging applications. Machine-learning models may be trained using synthetic data, e.g., data that is automatically generated by a computer, with no use of user information. In some implementations, machine-learning models may be trained, e.g., based on sample data, for which permissions to utilize user data for training have been obtained expressly from users. For example, sample data may include received messages. Based on the sample data, the machine-learning model can predict ways to parse and provide conversational framing to received messages, which may then be provided as presentations via alternative interfaces.

In some implementations, machine learning may be implemented on server devices, on client devices, or on both. In some implementations, a simple machine learning model may be implemented on a client device (e.g., to permit operation of the model within memory, storage, and processing constraints of client devices) and a complex machine learning model may be implemented on a server device. If a user does not provide consent for use of machine learning techniques, such techniques are not implemented. In some implementations, a user may selectively provide consent for machine learning to be implemented only on a client device. In these implementations, machine learning may be implemented on the client device, such that updates to a machine learning model or user information used by the machine learning model are stored or used locally, and are not shared to other devices such as a server device or other client devices.

In some implementations, a machine-learning application can include instructions that enable one or more processors to perform functions described herein, e.g., some or all of the method of FIG. 2.

In various implementations, a machine-learning application performing the functions described herein may utilize Bayesian classifiers, support vector machines, neural networks, or other learning techniques. In some implementations, a machine-learning application may include a trained model, an inference engine, and data. In some implementations, data may include training data, e.g., data used to generate trained model. For example, training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model, training data may include such user data. In implementations where users permit use of their respective user data, data may include permitted data such as images (e.g., photos or other user-generated images), communications (e.g., e-mail; chat data such as text messages, voice, video, etc.), and documents (e.g., spreadsheets, text documents, presentations, etc.).

In some implementations, training data may include synthetic data generated for the purpose of training, such as data that is not based on user input or activity in the context that is being trained, e.g., data generated from simulated conversations, computer-generated images, etc. In some implementations, the machine-learning application excludes data. For example, in these implementations, the trained model may be generated, e.g., on a different device, and be provided as part of machine-learning application. In various implementations, the trained model may be provided as a data file that includes a model structure or form, and associated weights. An inference engine may read the data file for trained model and implement a neural network with node connectivity, layers, and weights based on the model structure or form specified in trained model.

A machine-learning application can also include a trained model. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-tosequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, the trained model can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation may include applying a step/activation function to the adjusted weighted sum. In some implementations, the step/activation function may be a non-linear function. In various implementations, computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by a machine-learning application. In various implementations, a trained model includes a set of weights, or embeddings, corresponding to the model structure. In implementations where data is omitted, machine-learning application may include trained model that is based on prior training, e.g., by a developer of the machine-learning application, by a third-party, etc. In some implementations, the trained model may include a set of weights that are fixed, e.g., downloaded from a server that provides the weights.

The machine-learning application can also include an inference engine. The inference engine is configured to apply the trained model to data, such as application data, to provide an inference. In some implementations, the inference engine may include software code to be executed by a processor. In some implementations, the inference engine may specify circuit configuration (e.g., for a programmable processor, for a field programmable gate array (FPGA), etc.) enabling a processor to apply the trained model. In some implementations, the inference engine may include software instructions, hardware instructions, or a combination. In some implementations, the inference engine may offer an application programming interface (API) that can be used by an operating system and/or other applications to invoke the inference engine, e.g., to apply the trained model to application data to generate an inference.

A machine-learning application may provide several technical advantages. For example, when the trained model is generated based on unsupervised learning, the trained model can be applied by the inference engine to produce knowledge representations (e.g., numeric representations) from input data, e.g., application data. For example, a model trained for image analysis may produce representations of images that are substantially smaller in size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of the inference engine. In some implementations, knowledge representations generated by the machine-learning application may be provided to a different device that conducts further processing, e.g., over a network. In such implementations, providing the knowledge representations rather than the images may provide a substantial technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, the machine-learning application may be implemented in an offline manner. In these implementations, the trained model may be generated in a first stage, and provided as part of the machine-learning application. In some implementations, the machine-learning application may be implemented in an online manner. For example, in such implementations, an application that invokes the machine-learning application (e.g., the operating system, and/or one or more other applications) may utilize an inference produced by the machine-learning application, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update the trained model, e.g., to update embeddings for the trained model.

In some implementations, the machine-learning application may be implemented in a manner that can adapt to particular configuration of a device on which the machine-learning application is executed. For example, the machine-learning application may determine a computational graph that utilizes available computational resources, e.g., the processor. For example, if the machine-learning application is implemented as a distributed application on multiple devices, the machine-learning application may determine computations to be carried out on individual devices in a manner that optimizes computation. In another example, the machine-learning application may determine that the processor includes a GPU with a particular number of GPU cores (e.g., 1000) and implement the inference engine accordingly (e.g., as 1000 individual processes or threads).

In some implementations, the machine-learning application may implement an ensemble of trained models. For example, the trained model may include a plurality of trained models that are each applicable to same input data. In these implementations, the machine-learning application may choose a particular trained model, e.g., based on available computational resources, success rate with prior inferences, etc. In some implementations, the machine-learning application may execute the inference engine such that a plurality of trained models is applied. In these implementations, the machine-learning application may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by the operating system or one or more applications.

In different implementations, the machine-learning application can produce different types of outputs. For example, the machine-learning application can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by the machine-learning application in response to input), audio or video (e.g., in response to an input video, the machine-learning application may produce an output video with a particular effect applied, e.g., rendered in a comic-book or particular artist's style, when the trained model is trained using training data from the comic book or particular artist, etc. In some implementations, the machine-learning application may produce an output based on a format specified by an invoking application, e.g. the operating system or one or more applications. In some implementations, an invoking application may be another machine-learning application. For example, such configurations may be used in generative adversarial networks, where an invoking machine-learning application is trained using output from the machine-learning application and vice-versa.

Any of software in memory can alternatively be stored on any other suitable storage location or computer-readable medium. In addition, the memory (and/or other connected storage device(s)) can store one or more messages, one or more taxonomies, electronic encyclopedia, dictionaries, thesauruses, knowledge bases, message data, grammars, user preferences, and/or other instructions and data used in the features described herein. The memory and any other type of storage (magnetic disk, optical disk, magnetic tape, or other tangible media) can be considered "storage" or "storage devices."

An I/O interface can provide functions to enable interfacing the server device with other systems and devices. Interfaced devices can be included as part of a device or can be separate and communicate with the device. For example, network communication devices, storage devices (e.g., memory and/or database 106), and input/output devices can communicate via the I/O interface. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to the I/O interface can include one or more display devices that can be used to display content, e.g., images, video, and/or a user interface of an output application as described herein. A display device can be connected to a device via local connections (e.g., display bus) and/or via networked connections and can be any suitable display device. The display device can include any suitable display device such as an LCD, LED, or plasma display screen, CRT, television, monitor, touchscreen, 3-D display screen, or other visual display device. For example, the display device can be a flat display screen provided on a mobile device, multiple display screens provided in a goggles or headset device, or a monitor screen for a computer device.

The I/O interface can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   determining, based on a context of a user or a device presentation, to present via a voice interface, a messaging exchange between a plurality of participants, wherein the context is based on one or more of a location of a user device associated with the user, a movement of the user device associated with the user, or an indication that the user is driving a vehicle;
   identifying two objects in the messaging exchange, the messaging exchange comprising objects of different media types, wherein the two objects include a verbal object and a non-verbal object, wherein the non-verbal object includes one or more of an image, an animated image, an emoji, or a video;
   grouping the two objects into two groups by their different media types;
   analyzing the messaging exchange based on the two groups to determine a conversational structure of the messaging exchange;
   applying conversational framing to the two groups based on the conversational structure of the messaging exchange;
   generating the voice interface that includes a verbal representation of a textual description of the non-verbal object; and
   providing the voice interface for output by an audio output device.

2. The computer-implemented method of claim 1, wherein the context is further based on an available battery capacity of the user device.

3. The computer-implemented method of claim 1, wherein the context is further based on a scheduled activity on a calendar associated with the user.

4. The computer-implemented method of claim 1, wherein the non-verbal object includes a plurality of non-verbal objects, the method further comprising grouping the plurality of non-verbal objects into a same group based on the plurality of non-verbal objects being of a same media type.

5. The computer-implemented method of claim 1, further comprising analyzing the verbal object to expand a shorthand text in the verbal object that includes two or more letters or numbers into one or more words.

6. The computer-implemented method of claim 1, wherein a bot determines, based on the context of the user or the device presentation, that the messaging exchange could be presented via a voice interface and the bot asks the user for permission to present the messaging exchange in the voice interface.

7. The computer-implemented method of claim 6, further comprising invoking the bot to parse and read received messages to the user in the voice interface.

8. The computer-implemented method of claim 1, wherein the conversational framing includes one or more of an introductory conversational framing that introduces the two groups, an interstitial framing between the two groups, or a conclusory conversational framing that is inserted prior to a last object group.

9. A non-transitory computer-readable medium with instructions stored thereon that, when executed by one or more computers, cause the one or more computers to perform operations, the operations comprising:
   determining, based on a context of a user or a device presentation, to present via a voice interface, a messaging exchange between a plurality of participants, wherein the context is based on one or more of a location of a user device associated with the user, a movement of the user device associated with the user, or an indication that the user is driving a vehicle;
   identifying two objects in the messaging exchange, the messaging exchange comprising objects of different media types, wherein the two objects include a verbal object and a non-verbal object, wherein the non-verbal object includes one or more of an image, an animated image, an emoji, or a video;
   grouping the two objects into two groups by their different media types;
   analyzing the messaging exchange based on the two groups to determine a conversational structure of the messaging exchange;
   applying conversational framing to the two groups based on the conversational structure of the messaging exchange; and
   generating the voice interface that includes a verbal representation of a textual description of the non-verbal object; and
   providing the voice interface for output by an audio output device.

10. The non-transitory computer-readable medium of claim 9, wherein the context is further based on an available battery capacity of the user device.

11. The non-transitory computer-readable medium of claim 9, wherein the context is further based on a scheduled activity on a calendar associated with the user.

12. The non-transitory computer-readable medium of claim 9, wherein the non-verbal object includes a plurality of non-verbal objects and the operations further comprise grouping the plurality of non-verbal objects into a same group based on the plurality of non-verbal objects being of a same media type.

13. The non-transitory computer-readable medium of claim 9, wherein the operations further comprise analyzing the verbal object to expand a shorthand text in the verbal object that includes two or more letters or numbers into one or more words.

14. The non-transitory computer-readable medium of claim 9, wherein a bot determines, based on the context of the user or the device presentation, that the messaging exchange could be presented via a voice interface and the bot asks the user for permission to present the messaging exchange in the voice interface.

15. The non-transitory computer-readable medium of claim 14, wherein the operations further comprise invoking the bot to parse and read received messages to the user in the voice interface.

16. The non-transitory computer-readable medium of claim 8, wherein the conversational framing includes one or more of an introductory conversational framing that introduces the two groups, an interstitial framing between the two groups, or a conclusory conversational framing that is inserted prior to a last object group.

17. A system comprising:
    one or more processors; and
    a memory that stores instructions that, when executed by the one or more processors cause the one or more processors to perform operations comprising:
        determining, based on a context of a user or a device presentation, to present via a voice interface, a messaging exchange between a plurality of participants, wherein the context is based on one or more of a location of a user device associated with the user, a movement of the user device associated with the user, or an indication that the user is driving a vehicle;
        identifying two objects in the messaging exchange, the messaging exchange comprising objects of different media types, wherein the two objects include a verbal object and a non-verbal object, wherein the non-verbal object includes one or more of an image, an animated image, an emoji, or a video;
        grouping the two objects into two groups by their different media types;
        analyzing the messaging exchange based on the two groups to determine a conversational structure of the messaging exchange;
        applying conversational framing to the two groups based on the conversational structure of the messaging exchange;
        generating the voice interface that includes a verbal representation of a textual description of the non-verbal object; and
        providing the voice interface for output by an audio output device.

18. The system of claim 17, wherein the context is further based on an available battery capacity of the user device.

19. The system of claim 17, wherein the context is further based on a scheduled activity on a calendar associated with the user.

20. The system of claim 17, wherein the non-verbal object includes a plurality of non-verbal objects and the operations further comprise grouping the plurality of non-verbal objects into a same group based on the plurality of non-verbal objects being of a same media type.

* * * * *